March 27, 1934.  D. T. BROWNLEE  1,952,415

OVERRUNNING CLUTCH

Filed June 25, 1932

Inventor:
Dalmar T. Brownlee
By: Arthur Wm Nelson
Atty.

Patented Mar. 27, 1934

1,952,415

UNITED STATES PATENT OFFICE 1,952,415

OVERRUNNING CLUTCH

Dalmar T. Brownlee, Indianapolis, Ind., assignor to L. G. S. Devices Corporation, Indianapolis, Ind., a corporation of Indiana Application June 25, 1932, Serial No. 619,241

16 Claims. (Cl. 192—41)

This invention generally relates to overrunning clutches, including, a coil spring clutching element for cooperating with two relatively rotatable members to prevent their relative rotation in one direction while permitting free relative rotation in the other direction and the invention relates more particularly to the spring-like clutching element employed therein.

In clutches of this kind, a coil spring is operatively engaged with one of the rotatable members and cooperates with a cylindrical surface on the other member so that the spring will grip said surface when its diameter changes under an impressed torque in one direction and will recede from said surface and permit free relative rotation between the two members when they rotate relatively in the other direction.

While in general, such clutches are satisfactory, it frequently happens that the length of the spring necessary to carry a given load prevents the use of such clutches in the limited space available. Also, it has been found, that a creeping or sliding action takes place as the turns of the spring are forced into engagement with the cylindrical surface before mentioned, which action has a tendency to wear said surface as well as the gripping surface of the spring. Furthermore, when such clutches are subjected to a suddenly applied heavy torque, the last turn of the spring has a tendency to slip before the preceding turns of the spring are forced into full frictional engagement with said cylindrical surface. This slipping of the spring also has a tendency to wear said surfaces.

One of the objects of the present invention, is to produce a clutch for operatively connecting two relatively rotatable members in such a manner that free relative rotation of the members in one direction will be permitted while relative rotation in the other direction will be prevented.

Another object is to provide a clutch construction which increases the holding properties of such springs employed therein for a given length of spring.

A further object is to prevent creeping between the frictional gripping surfaces of the spring and the associated clutch member as the turns of the spring progressively engage the same.

Still another object is to provide a construction which insures that the turns of the spring progressively advance into full frictional gripping engagement with the associated cylindrical surface to prevent the clutch from slipping when the clutch is subjected to a suddenly applied heavy load.

Still a further object is to provide a construction which protects that portion of the clutch which carries the greatest load, against wear.

Again, it is an object of the invention to provide a spring for this purpose, that may be made at a low cost from materials readily obtained and which spring shall be efficient and durable in use.

In accordance with one feature of the present invention, free relative movement between two rotatable members is prevented when the members tend to rotate relatively in one direction and is permitted when they rotate relatively in the other direction, by providing one of the members with a cylindrical surface and securing one end of a helical spring to the other member, in such a manner that the free end of the spring is in light overrunning engagement with said cylindrical surface. As the two members tend to rotate relatively in one direction, the diameter of the spring changes progressively and is thus forced into frictional engagement with said cylindrical surface thereby clutching said two members firmly together. When said two members rotate relatively in the other direction, the spring recedes from said cylindrical surface and permits free relative movement between said members.

In accordance with other features of the invention the holding power of the clutch is increased by providing that part of the spring, which carries by far the greatest portion of the load, with a relatively wide frictional surface.

In accordance with another feature of the invention, the tendency of the clutch and the frictional surfaces of the turns in the spring to creep as they are forced into engagement with the cylindrical surface, is reduced by gradually decreasing the elasticity of the spring from the energizing portion thereof to the load carrying part of the spring.

In accordance with still another feature of the invention, that part of the clutch which carries the greatest portion of the load is protected against wear by providing its gripping surface with a suitable bearing material.

For a clearer understanding of the invention, reference may be made to the accompanying drawing in which—

Figure 1:
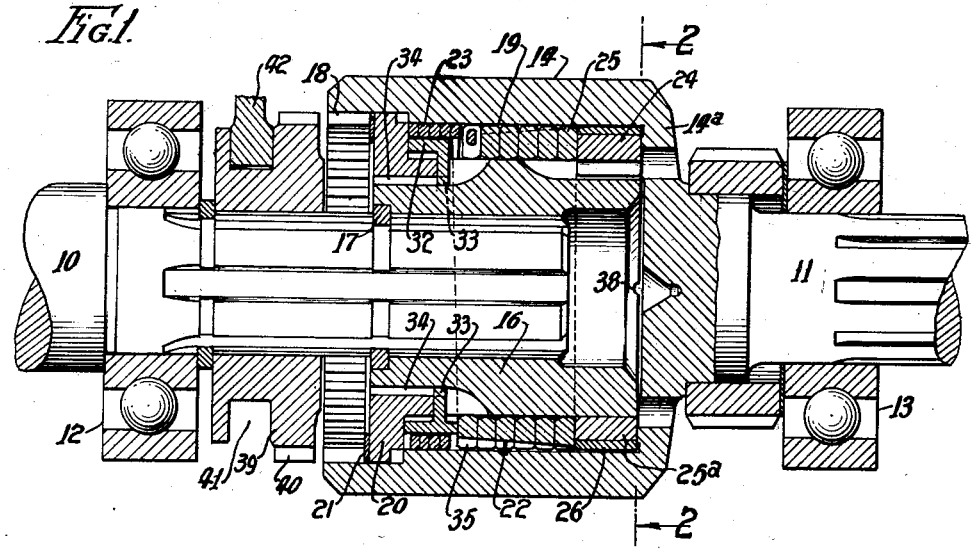
Figure 1 is a longitudinal sectional view through a clutch embodying the present invention, certain parts of the clutch being shown in elevation.

The drawing shows the clutch as operating between a driving shaft 10 and an axially arranged driven shaft 11, such as between the power take-off end of a change speed transmission shaft and an associated shaft adapted to be operatively connected to the propeller shaft of an automobile.

It is to be understood, that this shaft arrangement is merely as by way of illustration of one of the many uses, to which my improved clutch may be put.

The driving shaft 10 and driven shaft 11 are journalled in suitable antifriction bearings 12 and 13 respectively, which of course, are supported in the usual casing (not shown) in which the clutch is enclosed.

The driven shaft is formed at one end to provide a cup-shaped clutch member 14 which surrounds the splined end portion of the driving shaft 10. On said end portion of the driving shaft 10 is mounted a sleeve 16 held against longitudinal movement by a spring collar 17 carried by said end portion of the driving shaft. The open front end of the clutch member 14 is provided with internal spline teeth 18 the purpose of which will presently appear.

The clutch member 14 and sleeve 16 coact to provide a clutch spring recess, the clutching surface of which is formed by the internal annular surface 19 of the clutch member 14. Said recess is closed at one end by one end wall 14a of the clutch member 14 and is closed at the other end by a closure ring 20 that is rotatively mounted on one end of the sleeve 16 and has external splines for engagement with the splines 18 of the clutch member 14. This closure ring is held against endwise movement by a spring ring 21 that snaps into an annular groove formed in the splines 18 of said clutch member.

Figure 3:
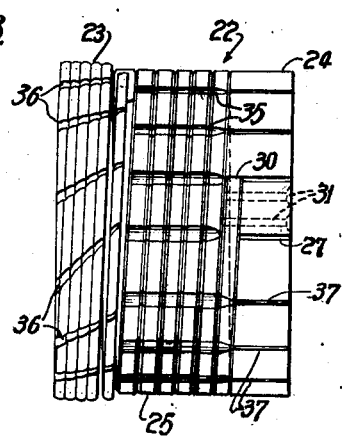
Figure 3 is a view, in side elevation, of the preferred type of spring, employed in my improved overrunning clutch.

In the clutch spring recess as provided by the clutch member 14 and sleeve 16, between the end wall 14a and ring 20, is located a clutching element in the form of a spring 22 best shown in side elevation in Fig. 3. This spring differs materially in several respects, from springs heretofore used for a similar purpose and comprises a plurality of sections or potrions, each cooperating with the others in accomplishing the desired purpose.

The spring includes an end energizing portion 23, an end load carrying portion 24 and an intermediate load building up portion 25 respectively. This last mentioned portion of the spring carries a plurality of turns, all made of wire of like cross sectional areas and having a normal outside diameter, less than that of the surface 19 so as to have a slight normal clearance with respect to the same and coiled with an inside diameter slightly smaller than the sleeve 16 so as to normally rest thereon under a light tension. In clutches wherein the surface 19 is of a 2½ inch diameter, the said building up portion is of such normal outside diameter as to have about .004 of an inch clearance.

The load carrying portion 24 as here shown, is made of a ring of steel 25a having a bearing metal operative surface formed by a bronze ring 26, preferably sweated upon said steel ring, or by a chromium surface preferably electrically deposited on the outside of the ring 25a which in this case is somewhat larger owing to the thinness of the chromium plating. Both rings 25a and 26 are split longitudinally as at 27. The load carrying portion which has a diameter approximating that of the building up portion is provided at one side of the split, with an inwardly extending lug or toe 28 adapted to engage in a recess 29 provided therefor in the corresponding end of the sleeve 16. That end of said load carrying portion facing the end wall 14a of the clutch member 14 is flat to correspond with said wall while the other end is made as a helix to correspond in pitch to the lead of the last turn of the building up portion of the spring.

This arrangement provides a thrust shoulder 30 on said load carrying portion with which the extremity of said last turn of the building up portion engages and said last turn is secured to that part of the load carrying portion on the other side of the slit as by the rivets or pins 31.

The energizing portion 23 embodies a plurality of turns all made of stock of a smaller cross sectional area than that of the building up portion and therefore in itself has greater elasticity and is secured at one end in the extremity of the last turn at the associated end of the building up portion which is provided with a hole in which said end of the energizing portion is secured in any suitable manner.

The energizing portion of the spring is of an external diameter slightly greater than the diameter of said surface 19 so as to normally have a slight frictional drag thereon. To prevent an abnormal contraction of said energizing portion, a supporting ring 32 is provided therefor, adjacent the ring 20 and said supporting ring has splines 33 engaging in grooves 34 in the sleeve 16.

To make those turns of the building up portion toward the energizing portion more elastic as they approach said energizing portion, they are provided with longitudinally extending, grooves 35 which gradually grow deeper toward that end associated with the energizing portion.

To increase the elasticity of the energizing portion toward its free end, I also provide therein, sets of grooves 36 with the grooves in each set disposed at an angle to the axis of the spring as a whole and said grooves grow deeper and wider toward the free end of said energizing portion as best shown in Figure 3. By arranging the grooves in this manner, each turn of this portion of the spring is less apt to break because said grooves are disposed at an angle to the plane of the stresses applied thereto in use.

In the bearing metal band 26, of the load carrying portion, I provide smaller longitudinal grooves 37 in line with the grooves of the load building up portion, said grooves 37 providing for the passage of lubricant in the operation of the clutch.

Figure 2:
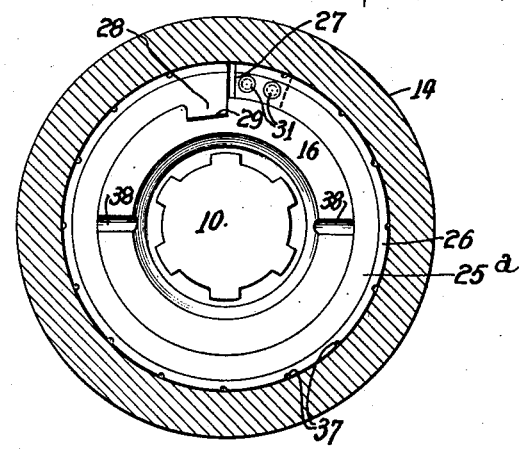
Figure 2 is a transverse sectional view through the clutch as taken along line 2—2 of Fig. 1.

In that end of the load carrying member facing the end wall 14a of the clutch member 14, I provide other lubricant channels 38 as best shown in Fig. 2.

On the driving shaft 10, between the bearing 12 and adjacent end of the clutch member 14, there is splined, a longitudinally shiftable collar 39 having external spline teeth 40 at one end and an annular groove 41 near its other end. The teeth 40 mate with teeth 18 in the clutch member 14 and the groove 41 receives a yoke 42 by which a longitudinal shifting movement may be imparted to said collar. When the collar is shifted to bring its splines into engagement with the splines 18 on the clutch member 14, it is apparent that this connects said clutch member positively to the shaft, regardless of the clutch spring 22.

With the parts shown in the position in Fig. 1, when the shaft 10 tends to rotate relatively to the shaft 11 in a direction to unwind the spring, the frictional drag between the end of the first turn in said energizing portion and the surface 19 increases until it is sufficient to force this end of the spring into full frictional engagement with said surface 19, thereby preventing further relative movement therebetween.

As it is evident that the total frictional drag of the energizing portion during overrun is the sum of that of the turns, and is transferred to the building up portion from the last turn of the energizing portion, and as this drag tends to contract the diameter of said energizing portion, it is obvious that this contraction is greatest in the last turn of the energizing portion and least in the first turn in either the overrunning or normal condition. Thus it is apparent that when the parts tend to rotate relatively in a direction to unwind the spring, the first turn of the energizing portion will expand into full frictional engagement and the remaining turns will follow in order. When further relative movement between the end of the first turn of said energizing portion and said surface 19 is prevented, a pressure is created in the spring which forces the remainder of the first turn into full frictional engagement with the recess walls. As the first turn expands, into full frictional engagement, the holding power of the clutch rapidly increases.

In like manner, the remainder of the turns in the spring are forced outwardly into full frictional engagement with the surface 19 and the holding power of the clutch increases accordingly.

Inasmuch as the energizing portion 23 of the spring is composed of relatively narrow flexible wire, and since it is normally in contact with the surface 19, it acts as an energizing coil; that is, it increases the sensitivity of the clutch. The number of turns in said energizing portion when taken in connection with the width of the frictional surfaces of the turns, should be such as to create sufficient pressure in the end of the last turn to force the end of the first turn in the building up portion 25 outwardly into frictional engagement with said surfaces. Also, the strength of the wire in said building up portion should be and is such as to permit the wire from which said portion is made to transmit this pressure without deformation. By reason of the longitudinal grooves 35 the elasticity of the beginning of building up portion 25 is greatly increased toward the energizing spring end with the result that the size and number of turns in the energizing portion may be reduced accordingly.

Since the friction developed as the turns progressively expand into frictional engagement with the surface 19, rapidly increases, it is evident that the last part of the spring carries the greatest portion of the load. In order, therefore, to prevent failure of the clutch, it has heretofore been necessary to proportion the number of turns and the frictional surfaces thereof so that the load carried by the last turn is not in excess of the friction capable of being developed between the frictional surface of the last turn and the associated surface to be gripped thereby.

Heretofore, this has necessitated a relatively long spring for a given load, since, if the frictional surface of the wire were increased, the sensitivity of the clutch decreased. By making the turns in the building up portion from relatively narrow elastic wire and providing the load carrying portion 24 as described, it is possible to greatly reduce the overall length of the spring for a given load while maintaining the desired sensitivity.

The width of the load carrying portion is such as to be capable of developing sufficient friction to carry the load transmitted thereto without slipping. The number of turns and the frictional surface thereof in the building up portion is such that the pressure developed in the end of the last turn is sufficient to expand the load carrying portion and the strength of the wire is such as to stand this pressure without deformation.

Since the pressure which unwinds and expands the spring is derived from the cylindrical surface 19 of the clutch member 14, said pressure is applied tangentially and as a result the turns have a tendency to creep or slide as they are forced into full frictional engagement with said surface 19. This tendency to slide or creep is augmented by the elasticity of the various portions of the spring and the imperfections in the frictional surfaces thereof. Since the pressure which tends to unwind and therefore radially expand the spring rapidly increases toward the load carrying end thereof, the tendency of the turns to slide or creep increases accordingly. This tendency of the turns to slide or creep is opposed by the resiliency of the spring; hence, by gradually decreasing the elasticity of the building up portion as described and by providing the load carrying portion 24 as described, this tendency of the turns to slide is reduced to a minimum. Since the tendency of the turns to slide or creep at the front part or energizing end of the spring is relatively small, no substantial wear develops between the frictional surfaces at this portion of the clutch. At the rear part or load carrying end of the spring this tendency is greatly increased and normally causes considerable wearing of the frictional surfaces. However, by providing the bearing metal surface 26 as before described, the wearing of the associated frictional surfaces is avoided. Providing a bearing surface between the frictional surfaces of the clutch however, decreases the holding power of the clutch; hence, it is essential that only that portion of the clutch which normally is subjected to the greatest wear be provided with a bearing surface.

Gradually increasing the resiliency or elasticity of the spring from its load carrying portion to its energizing portion insures that the respective turns progressively expand into full frictional engagement with the surface 19 of the recess, with the result that there is less likelihood of the clutch slipping when subjected to suddenly applied loads. In the event, however, that some slipping does occur, the wearing effects thereof are minimized by the bearing metal surface 26.

When the members 10 and 11 rotate relatively in a direction to wind up the spring the load carrying portion and the building up portion contract radially and recede out of engagement with the surface 19 and the energizing portion 23 is returned to its normal frictional drag engagement with the surface 19 thereby permitting free relative rotation between shafts 10 and 11.

By employing an energizing portion for the spring and maintaining this portion normally in contact with the surface 19 and the load carrying portion normally out of contact with said surface, the same not only insures a more rapid clutching action when the two shafts tend to rotate relatively in a direction to unwind the spring, but also prevents the clutch from heating when the members rotate relatively in a direction to wind up the spring. Also various other modifications may be made; for example, the load carrying portion may comprise two or more turns and the width of these turns may decrease toward the resilient end of the spring.

In the event it is desired to lock out the action of the spring, the collar member 39 is shifted axially along shaft 10 until the splines 40 and 18 mesh, at which time the two shafts are positively locked together and the spring becomes inoperative.

While in describing the invention, I have referred in detail to the form, arrangement and construction of the various parts thereof, the same is to be considered as illustrative only, so that I do not wish to be limited thereto except as may be necessary by limitations in the appended claims.

I claim as my invention:—

1. In an overrunning clutch, the combination of a driving member, a driven member and a spring associated with said members and operating in a relative rotation of said members in one direction for clutching said members together, said spring including a load carrying portion and a building up portion, the load carrying portion being a relatively wide split band having one end attached to said building up portion.

2. In an overrunning clutch, the combination of a driving member, a driven member and a spring associated with said members and operating in a relative rotation of said members in one direction for clutching said members together, said spring including a load carrying portion and a building up portion, the load carrying portion being a relatively wide split band having one end attached to said building up portion, and being operatively connected at its other end to one of said members.

3. In an overrunning clutch, the combination of a driving member, a driven member and a spring associated with said members and operable in a relative rotation of said members in one direction for clutching said members together, said spring including a load carrying portion and a building up portion, the turns of the building up portion having grooves formed in their operative surfaces that vary in depth so as to increase the elasticity of said turns from that end associated with the load carrying portion said turns of the building up portion normally having a diameter approximating that of the load carrying portion.

4. In an overrunning clutch, the combination of a driving member and a driven member and a spring associated with said members and operating in a relative rotation of said members in one direction for clutching said members together, said spring including a load carrying portion and a building up portion, the turns comprising the building up portion having grooves therein that increase the elasticity of said building up portion in a direction away from the load carrying portion which is provided in its operative surface with grooves for the passage of lubricant arranged in line with the grooves in said building up portion.

5. In an overrunning clutch, the combination of a driving member and a driven member and a spring associated with said members and operating in a relative rotation of said members in one direction for clutching said members together, said spring including a load carrying portion and a building up portion, said building up portion comprising a plurality of turns having an elasticity greater than that of the load carrying portion which latter constitutes a split band formed at one end with a helical surface corresponding to the lead of the associated end turn of the building up portion and which is secured thereto.

6. In an overrunning clutch, the combination of a driving member, a driven member and a spring associated with said members and operable in a relative rotation of said members in one direction for clutching said members together, said spring including a load carrying portion, a building up portion and an energizing portion, the diameter of said energizing portion when said portion is in its unstressed condition being different from that of said building up portion which is substantially the same as that of the load carrying portion.

7. In an overrunning clutch, the combination of a driving member, a driven member and a spring associated with said members and operable in a relative rotation of said members in one direction for clutching said members together, said spring including a load carrying portion, a building up portion and an energizing portion, said energizing portion comprising a plurality of turns having a greater elasticity than that of the turns of the building up portion and having a diameter approximating that of said building up and load carrying portions.

8. In an overrunning clutch, the combination of a driving member, a driven member and a spring associated with said members and operable in a relative rotation of said members in one direction for clutching said members together, said spring including a load carrying portion, a building up portion and an energizing portion, said energizing portion comprising a plurality of turns having grooves therein that increase their elasticity and which grooves are arranged at an angle to the longitudinal axis of the spring.

9. In an overrunning clutch, the combination of a driving member, a driven member and a spring associated with said members and operable in a relative rotation of said members in one direction for clutching said members together, said spring including a load carrying portion, a building up portion and an energizing portion, said energizing portion comprising a plurality of turns having a number of sets of grooves therein, with the grooves in each set arranged at an angle to the longitudinal axis of the spring.

10. In an overrunning clutch, the combination of a driving member, a driven member and a spring associated with said members and operating in a relative rotation in one direction of said members for clutching said members together, said spring including an energizing portion and a second portion with the turns of said energizing portion having grooves therein to increase their elasticity and which grooves are arranged at an angle to the longitudinal axis of the spring.

11. In an overrunning clutch, the combination of a driving member, a driven member and a spring associated with said members and operating in a relative rotation in one direction of said members for clutching said members together, said spring including an energizing portion and a second portion, said second portion having longitudinal grooves therein to increase the flexibility of the turns of said second portion towards said energizing portion, the turns of said energizing portion having grooves therein to increase their elasticity and which grooves are arranged at an angle to the longitudinal axis of the spring.

12. A spring for an overrunning clutch comprising an energizing portion, a building up portion and a load carrying portion, the various portions being arranged axially and the load carrying portion being a relatively wide band having one end attached to the building up portion.

13. A spring for an overrunning clutch comprising a relatively wide load carrying portion in the form of inner and outer split bands, a building up portion having turns of such character as to make the same more elastic than said load carrying portion and secured to one of the bands thereof, said spring further including an energizing portion having turns so formed as to make the same more elastic than either of the first two mentioned portions the various portions being arranged axially.

14. A spring for an overrunning clutch comprising an intermediate building up portion, a load carrying portion secured to one end of said building up portion and an energizing portion fixed to the other end of said building up portion and having a greater flexibility than said building up portion, the various portions being arranged axially and the load carrying portion being a relatively wide split band having one end attached to the building up portion.

15. A spring for an overrunning clutch comprising an energizing portion, a building up portion and a load carrying portion, the load carrying portion comprising a relatively wide split band having one end attached to the building up portion and also having a bearing material on its operative gripping surface different from that of which the load carrying portion is formed.

16. A spring for an overrunning clutch comprising an intermediate building up portion, a load carrying portion comprising a relatively wide split band having one end attached to the building up portion and also having a bearing metal gripping surface different from that of which said load carrying portion is formed and secured to one end of said building up portion and an energizing portion secured to the other end of said building up portion and being more elastic than the same.

DALMAR T. BROWNLEE.